US012580731B2

(12) United States Patent
Hamburg

(10) Patent No.: US 12,580,731 B2
(45) Date of Patent: Mar. 17, 2026

(54) ENCRYPTION OF ERROR CORRECTION DATA USING SYMBOL-LEVEL CIPHERS

(71) Applicant: CRYPTOGRAPHY RESEARCH, INC., San Jose, CA (US)

(72) Inventor: Michael Alexander Hamburg, 's-Hertogenbosch (NL)

(73) Assignee: CRYPTOGRAPHY RESEARCH, INC., San Jose, CA (US)

( * ) Notice: Subject to any disclaimer, the term of this patent is extended or adjusted under 35 U.S.C. 154(b) by 223 days.

(21) Appl. No.: 18/204,694

(22) Filed: Jun. 1, 2023

(65) Prior Publication Data

US 2023/0396410 A1     Dec. 7, 2023

Related U.S. Application Data

(60) Provisional application No. 63/485,072, filed on Feb. 15, 2023, provisional application No. 63/348,314, filed on Jun. 2, 2022.

(51) Int. Cl.
*H04L 9/06* (2006.01)
*G06F 11/10* (2006.01)
*H03M 13/03* (2006.01)

(52) U.S. Cl.
CPC ........ *H04L 9/0618* (2013.01); *G06F 11/1048* (2013.01); *H03M 13/03* (2013.01); *H04L 2209/34* (2013.01)

(58) Field of Classification Search
CPC .............. H04L 9/0618; H04L 2209/34; G06F 11/1048; H03M 13/03
See application file for complete search history.

(56) References Cited

U.S. PATENT DOCUMENTS

| | | | |
|---|---|---|---|
| 7,941,725 B2 | 5/2011 | Francillon et al. | |
| 9,626,517 B2 | 4/2017 | Obukhov | |
| 9,787,470 B2 | 10/2017 | Pisek et al. | |
| 10,050,645 B2 | 8/2018 | Wang et al. | |
| 10,333,698 B2 | 6/2019 | Shamee et al. | |
| 2019/0042369 A1* | 2/2019 | Deutsch ................ | G06F 3/0673 |
| 2019/0229925 A1* | 7/2019 | Kounavis ............ | G06F 11/2094 |
| 2021/0149825 A1* | 5/2021 | Durham ................ | G06F 9/5016 |

OTHER PUBLICATIONS

Kounavis, Michael et. al., "The MAGIC Mode for Simultaneously Supporting Encryption, Message Authentication and Error Correction", Intel Labs, Feb. 16, 2021. Downloaded on Jun. 1, 2022 at: https://eprint.iacr.org/2020/1460. 78 pages.

* cited by examiner

*Primary Examiner* — Ellen Tran
(74) *Attorney, Agent, or Firm* — Lowenstein Sandler LLP

(57) ABSTRACT

Aspects and implementations include systems and techniques for encryption and decryption of error-corrected codewords for combined protection against corruption of data and adversarial attacks, including obtaining a block of data that has a first plurality of symbols, generating, based on the first plurality of symbols, a second plurality of symbols, wherein the second plurality of symbols includes one or more error correction symbols for the first plurality of symbols, encrypting the second plurality of symbols using a set of symbol-level ciphers (SLCs) to obtain an encrypted plurality of symbols, and using the encrypted plurality of symbols in a computer operation.

18 Claims, 6 Drawing Sheets

ENCRYPTION OF ERROR CORRECTION DATA USING SYMBOL-LEVEL CIPHERS

RELATED APPLICATIONS

This application claims the benefit of priority from U.S. Provisional Application No. 63/348,314, filed on Jun. 2, 2022, and U.S. Provisional Application No. 63/485,072, filed on Feb. 15, 2023, which is incorporated herein by reference.

TECHNICAL FIELD

The disclosure pertains to computing applications, more specifically to systems and methods that improve protection of data against adversarial attacks without compromising the ability of error correction techniques to recover the data in the instances of random (non-adversarial) data corruption.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
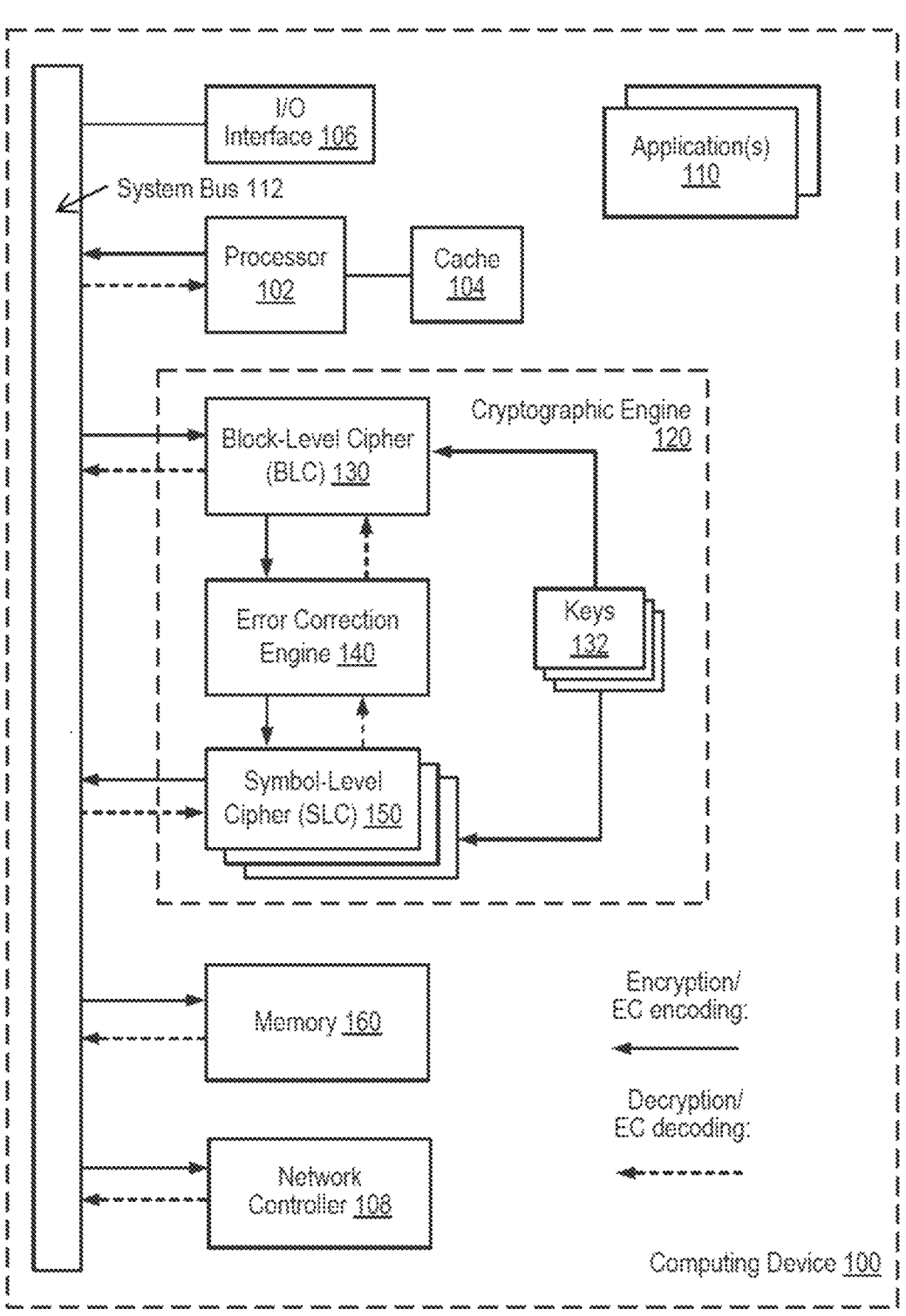
FIG. 1 is a block diagram of an example computer system in which implementations of the disclosure may operate.

Aspects and implementations of the present disclosure are related to systems and techniques that, on one hand, prevent (or hinder) adversarial tampering with data, while, on the other hand, are capable of correcting errors that may spontaneously occur during data storage or transmission. Error correction (EC) techniques operate by storing, in conjunction with actual data, some amount of additional EC data that is redundant under ideal conditions, but enables to identify parts of the data that become lost in transmission or corrupted during write operations or storage of the data. For example, a message (or block) of k symbols (e.g., bytes, double-bytes, etc.) of data may be stored in a memory device (and/or communicated over a network) together with t symbols of an EC (also called parity) code for the data, in what is usually referred as a codeword of n=k+t symbols. For example, a codeword with n=40 symbols may include k=32 data symbols an t=8 EC (parity) symbols. A codeword may often be cryptographically protected using a suitable cipher algorithm.

EC techniques allow to detect and correct up to a certain number of "correctable errors" (errors in unknown positions/symbols), e.g., up to t/2 correctable errors, or up to a certain number of "erasures" (errors in known positions), e.g., up to t erasures, or to identify (but not correct) a certain number of "detectable errors," e.g., up to t detectable errors, or achieve some combination thereof. If the number of errors (#errors) added to twice the number of correctable errors (2 #corr. errors) exceeds the number of EC symbols (#errors+2 #corr. errors>t), the EC code may still be able to correct the errors but with a probability that is less than 100%. In a well-designed EC code, a failure to correct errors typically results in an uncorrectable error response, with a minuscule (e.g., one in a trillion) probability of a wrong correction to an invalid data.

Such a beyond-the-threshold EC capability (and, similarly, the capability to identify excessive detectable errors) is typically reasonably efficient against random errors (e.g., caused by a noise in the environment or network), but is much less so against adversarial attempts to change the data. An adversarial attacker can gain access to some system components (e.g., a system bus), collect statistics of EC code operations, and replace data with other data. The attacker can further identify a specific EC code being used for data correction. Typical EC codes can include Reed-Solomon (RS) codes, Bose-Chaudhuri-Hocquenghem (BCH) codes, Hamming codes, and the like. An attacker can gain access to or reconstruct a matrix that is used to generate EC symbols from the data symbols and replace the entire codeword in the memory (or network transmission). Alternatively, the attacker may generate a replacement codeword that is within t/2 errors from an intended (by the attacker) codeword and simply rely on the EC code to self-correct the replacement codeword to the intended codeword.

To prevent an attacker from replacing the codeword, a message authentication code (MAC) or tag may be generated together with the codeword. When the codeword and the MAC are retrieved from memory (or received over network), the receiving device may decrypt the codeword and recreate the MAC using the decrypted data symbols. Comparison of the recreated MAC with the retrieved MAC then indicates whether the codeword has been altered. Storing a MAC, however, requires additional memory space. On the other hand, if a MAC takes up some of the space allocated for EC symbols, the error correction capability of the remaining EC symbols is reduced.

Aspects of the present disclosure address the above noted and other shortcomings of the existing technology by enabling systems and techniques for providing message authentication functionality without incurring a cost of storage of authentication tags. In some implementations, a block of k symbols of data may be encrypted using a block-level cipher, which may produce k encrypted symbols. The obtained k encrypted symbols may then be processed by an EC code to generate a codeword of n symbols. Each of the n symbols may further be encrypted using a symbol-level cipher. The n encrypted symbols output by n (or fewer) symbol-level ciphers may be stored in a memory or communicated over a network. When the data is retrieved from the memory or received over the network, the decryption and EC decoding operations may be performed in the reverse order. More specifically, the retrieved n encrypted symbols are first decrypted with symbol-level ciphers before undergoing EC decoding. As a result, an error in an encrypted symbol results in a single error in a codeword that undergoes EC decoding. Therefore, with respect to random errors in the encrypted codeword, the error detection and correction capability of the disclosed implementations retain the full efficiency of the underlying EC code, e.g., ensuring that up to $t/2$ symbols errors may be reliably detected and corrected. On the other hand, an attempt by an attacker to modify the stored codeword may induce errors in more than $t/2$ symbols causing the EC decoding to return an uncorrectable error. In some implementations, having detected an uncorrectable error, the EC decoding may treat the error as a potential adversarial attack and take various remedial actions, such as discarding the data in which the error has been detected (and any other related data), erasing the data (e.g., the related data, including all data currently stored in the memory of the device), triggering an alarm, causing a fault, powering down the device, and/or the like. In some implementations, the EC decoding may treat even a correctable error as a potential adversarial attack (and take a corresponding remedial action) provided that the number of errors less than $t/2$ but more than a certain (e.g., empirically) set number $n^*$. The symbol-level ciphers prevent an attacker from collecting enough statistics to mount a successful data replacement attack even in situations where the EC code itself is publicly known or discoverable by the attacker.

Multiple variations of the above techniques are disclosed herein. The advantages of the disclosed systems and techniques include but are not limited to efficient protection of data against both random corruption and adversarial attacks without generating authentication tags and incurring additional costs in memory to store these authentication tags.

FIG. 1 is a block diagram illustrating an example computing device 100 in which implementations of the present disclosure may operate. Computing device 100 may be any desktop computer, a tablet, a smartphone, a server (local or remote), a thin/lean client device, a server, a cloud computing node, an edge device, a network switch, a gateway device, a card reader, a wireless sensor node, an Internet-of-Things (IoT) node, an embedded system dedicated to one or more specific applications, and so on. Computing device 100 may have one or more processors 102, e.g., central processing units (CPUs), graphics processing units (GPUs), field-programmable gate arrays (FPGA), application-specific integrated circuits (ASICs), and the like. "Processor" refers to a device capable of executing instructions encoding arithmetic, logical, or I/O operations. In one illustrative example, a processor may follow Von Neumann architectural model and may include one or more arithmetic logic units (ALUs), a control unit, and may further have access to a plurality of registers, or a cache 104.

Processor 102 may include one or more processor cores. In implementations, each processor core may execute instructions to run a number of hardware threads, also known as logical processors. Various logical processors (or processor cores) may be assigned to one or more processes supported by processor 102, although more than one processor core (or a logical processor) may be assigned to a single processor for parallel processing. A multi-core processor may simultaneously execute multiple instructions. A single-core processor may typically execute one instruction at a time (or process a single pipeline of instructions).

Computing device 100 may support one or more applications 110. Application(s) 110 supported by computing device 100 may include machine-learning application(s), graphics application(s), computational application(s), cryptographic application(s) (such as authentication, encryption, decryption, secure storage application(s), etc.), embedded application(s), external application(s), or any other types of application(s) that may be executed by computing device 100. Application(s) 110 may be instantiated on the same computing device 100, e.g., by an operating system executed by the processor 102 and residing in the memory 160. Alternatively, the external application(s) may be instantiated by a guest operating system supported by a virtual machine monitor (hypervisor) operating on the computing device 100. In some implementations, the external application(s) may reside on a remote access client device or a remote server (not shown), with the computing device 100 providing computational support for the client device and/or the remote server.

Computing device 100 may further include an input/output (I/O) interface 106 to facilitate connection of the computing device 100 to various peripheral hardware devices (not shown in FIG. 1) such as card readers, terminals, printers, scanners, IoT devices, and the like. Computing device 100 may further include a network controller 108 to facilitate connection to a variety of networks (Internet, wireless local area networks (WLAN), personal area networks (PAN), public networks, private networks, etc.), and may include a radio front end module and other devices (amplifiers, digital-to-analog and analog-to-digital converters, dedicated logic units, etc.) to implement data transfer to/from computing device 100. Various hardware components of the computing device 100 may be connected via a system bus 112 that may include its own logic circuits, e.g., a bus interface logic unit (not shown in FIG. 1).

Computing device 100 may include a cryptographic engine 120 that may be any collection of hardware circuits capable of performing various tasks described herein. In some implementations, functions of cryptographic engine 120 may be and/or performed by software processes executed by processor 102. Cryptographic engine 120 may include at least one block-level cipher (BLC) 130 capable of encrypting a block of data as a whole. For example, BLC 130 may encrypt a 128-bit block, a 256-bit block, a 512-bit block, and so on. In particular, a 512-bit block of data that includes 32 two-byte symbols may be encrypted with BLC 130 to produce an encrypted 512-bit block of data such that each of the 32 symbols of the encrypted block of data depends on all symbols of the input 32-symbol block of data. BLC 130 may be a Rijndael cipher, a Kalyna cipher, an Encrypt-Mix-Encrypt AES-based cipher, an Adiantum cipher, or any other similar cipher.

Cryptographic engine 120 may include an error correction engine 140, which may be any computational circuit (or software unit) that implements an EC code, such as a Reed-Solomon (RS) code, a Bose-Chaudhuri-Hocquenghem (BCH) code, a Hamming codes, or any other suitable EC code.

Cryptographic engine 120 may include a set of symbol-level ciphers (SLCs) 150. Each SLC 150 may be capable of encrypting one or more (e.g., two, four, etc.) symbols separately, e.g., independently of other symbols (which may be encrypted with other SLCs). SLCs 150 may include a Swap-or-not cipher, a mix-cut shuffle cipher, a custom-design cipher, or any other suitable small-block cipher. BLC 130 and SLCs 150 may use one or more cryptographic keys 132 to perform encryption and decryption operations.

Computing device 100 may include one or more memory 160 devices operatively coupled to processor 102 and/or cryptographic engine 120. The memory 160 may refer to any volatile or non-volatile memory and may include a read-only memory (ROM), a random-access memory (RAM), electrically erasable programmable read-only memory (EE-PROM), flash memory, flip-flop memory, or any other device capable of storing data. RAM may be a dynamic random-access memory (DRAM), synchronous DRAM (SDRAM), a static memory, such as static random-access memory (SRAM), and the like. In some implementations, processor(s) 102 and memory 160 may be implemented as a single controller, e.g., as an FPGA. Memory 160 may include multiple memory chips. In some implementations, separate memory chips may be accessed via separate memory channels that allow simultaneous write (store) and read (load) operations, e.g., simultaneous storing and/or reading of multiple data symbols.

Computing device 100 may be capable of performing various encryption/EC encoding operations (indicated with solid arrows) and decryption/EC decoding operations (indicated with dashed arrows). More specifically, during encryption of data, processor 102 may generate a plaintext block of data that may be delivered to BLC 130, e.g., over system bus 112. BLC 130 may encrypt the block of data and provide the encrypted block to EC engine 140. EC engine 140 may execute an EC code to encode a codeword using the encrypted block and may provide the codeword, consisting of multiple symbols, to SLCs 150. Each SLC 150 may encrypt a separate symbol of the codeword (or multiple, e.g., two, symbols of the codeword). The resulting set of encrypted codeword symbols may then be stored in memory 160 and/or delivered to network controller 108 and transmitted over the network.

During decryption of data, the above operations may be performed in the reverse order. More specifically, a set of encrypted codeword symbols may be fetched from memory 160 or received over the network via network controller 108. The encrypted codeword symbols may be delivered to cryptographic engine 120 over system bus 122. Each SLC 150 may decrypt a respective symbol of the codeword (or multiple symbols of the codeword) and provide the decrypted symbols to EC engine 140. EC engine 140 may execute the EC code to decode the codeword and to obtain a block of data, which may still be encrypted by a block-wide cipher. The encrypted block of data is then provided to BLC 130 for decryption into a plaintext block of data. The plaintext block of data may then be provided, e.g., over system bus 112, to processor 102, stored in cache 104, communicated over a network, and/or subjected to any suitable computational operation.

Any functions or components depicted as part of BLC 130, EC engine 140, SLCs 150, and other engines may be implemented as dedicated hardware circuits, or as software modules executed on any suitable processor (e.g., processor 102), or as any combination of dedicated hardware circuits and software modules.

Figure 2:
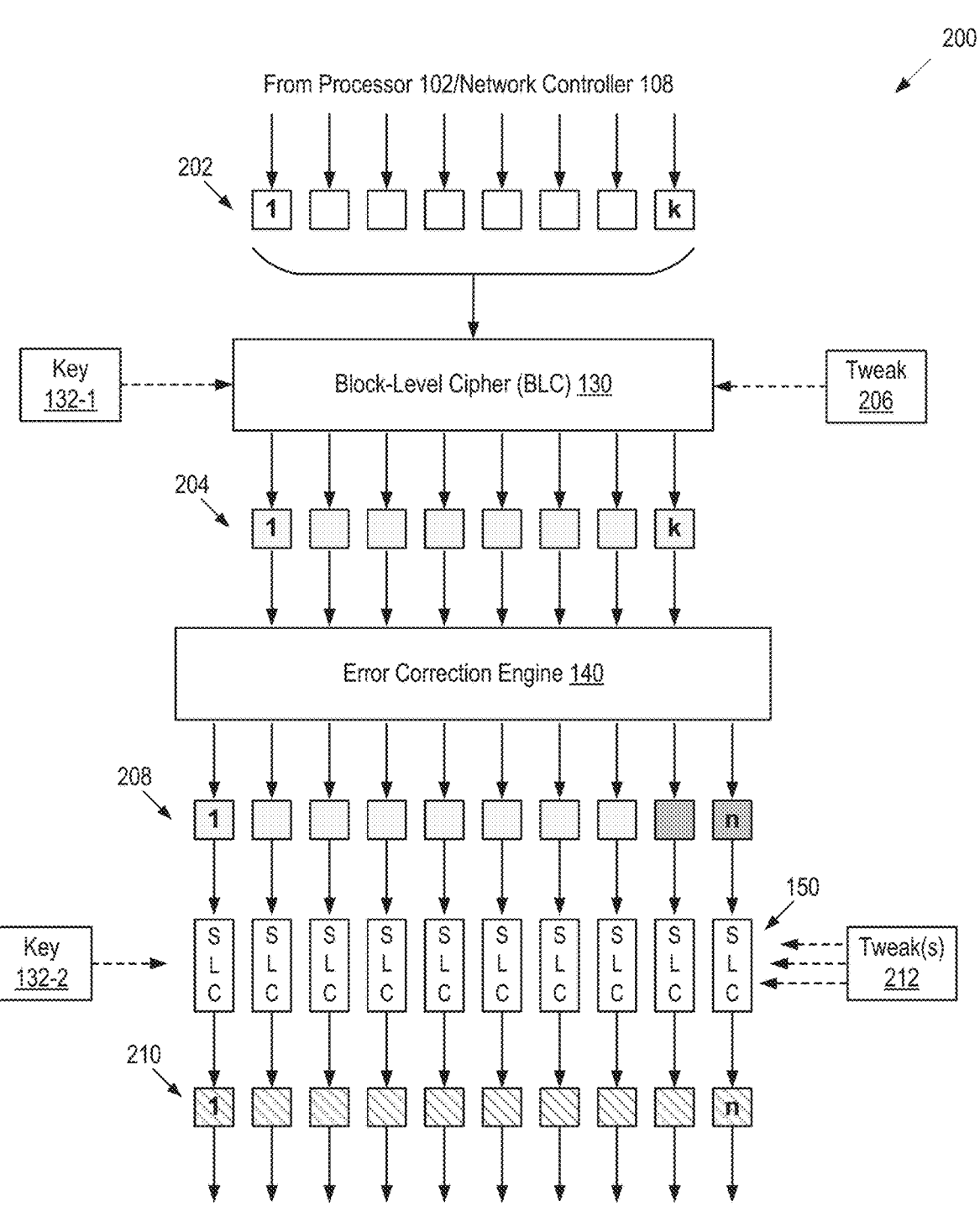
FIG. 2 is a diagram illustrating operations of encryption of an error-corrected codeword for protection against corruption of data and adversarial attacks, in accordance with some aspects of the present disclosure.

FIG. 2 is a diagram illustrating operations 200 of encryption of an error-corrected codeword for protection against corruption of data and adversarial attacks, in accordance with some aspects of the present disclosure. In some implementations, operations 200 may be performed by cryptographic engine 120 of FIG. 1. As depicted in FIG. 2, operations 200 may be performed on a data block (message) 202 received from processor 102 or via network controller 108 (e.g., as a direct memory write operation by a remote device). Data block 202 may include k plaintext (unencrypted) symbols. Each symbol may include multiple bits. Although FIG. 1 depicts eight symbols for conciseness, it should be understood that data block 202 may include any number of symbols. Data block 202 may be input into a block-level cipher (BLC) 130 that performs a block-wide encryption to produce an encrypted data block 204. Block-wide encryption means that each output symbol of encrypted data block 204 is encrypted in view of each symbol of data block 202, such that a change in any given symbol of data block 202 leads, in general, to a change in each of symbols of encrypted data block 204 (possibly with random but not systematic exceptions). For example, BLC 130 may be a pseudorandom permutation cipher that permutes all symbols (or even all bits) of data block 202. The output of BLC 130 may have the same number k of encrypted symbols as the data block 204, but this is not a requirement. In some implementations, the output of BLC 130 may include more than k encrypted symbols.

BLC 130 may use additional inputs to encrypt data block 202, e.g., a cryptographic key 132-1, which may be a master key, a session key, a round key, or any other secret cryptographic key. Additional input to BLC 130 may include a tweak value (or, simply, tweak) 206. Tweak 206 may be any value that is specific to the current operation, e.g., a memory address where the data may be stored (after various operations of FIG. 2 on data block 202 are completed). Additional input to BLC 130 may include a counter (e.g., to protect against replay attacks) or any other suitable nonce value.

Encrypted data block 204 may be input into an EC engine 140. EC engine 140 may be any suitable engine implementing an EC code, e.g., RS code, BCH code, Hamming code, and the like. EC engine 140 may implement an algorithm which treats each m-bit symbol as an element of the Galois field $GF(2^m)$, e.g., a polynomial of order m−1. EC engine 140 may output a codeword 208 having n symbols. In some implementations, codeword 208 may include k symbols of encrypted data block 204 and n−k EC (parity) symbols generated by EC engine 140. In some embodiments, none of n symbols of codeword 208 are the same as any of k symbols of encrypted data block 204, while the EC algorithm implemented by EC engine 140 may be capable of recovering k symbols of encrypted data block 204 based on any k uncorrupted symbols of codeword 208.

Codeword 208 may be processed by a set of symbol-level ciphers (SLCs) 150. In some implementations, a single SLC may be an m x p-bit wide SLC that simultaneously encrypts p symbols (of m bits each) of codeword 208. In some implementations, p may be a small number, e.g., p=1, 2, etc. In some implementations, each SLC may be encrypting one symbol (p=1) of codeword 208 to obtain a respective symbol of an encrypted codeword 210. This may have an advantage that an error in a given symbol of encrypted codeword 210 amounts (upon decryption described in relation to FIG. 3) to an error of only a single symbol of codeword 208, thus maintaining a full error-correcting functionality of the EC algorithm. In some implementations, the set of SLCs may include n/p SLCs, with each SLC encrypting p symbols of codeword 208 sequentially (and independently).

SLCs 150 may use additional inputs to encrypt symbols of codeword 208, e.g., a cryptographic key 132-2, which may be the same as or different from cryptographic key 132-1. Additional inputs to SLCs 150 may include one or more tweaks 212. In some implementations, each symbol of codeword 208 may be encrypted with an individualized tweak 212, which may be constructed from e.g., the memory address (including a symbol offset) where the respective symbol of encrypted codeword 210 is to be stored. Additional inputs to SLCs 150 may include various counters, e.g., a global counter of codewords 208 and/or a counter of individual symbols of codeword 208, and so on.

The encoded symbols of encrypted codeword 210 may be stored in memory 160 and/or provided to network controller 108 for transmission over a network.

Figure 3:
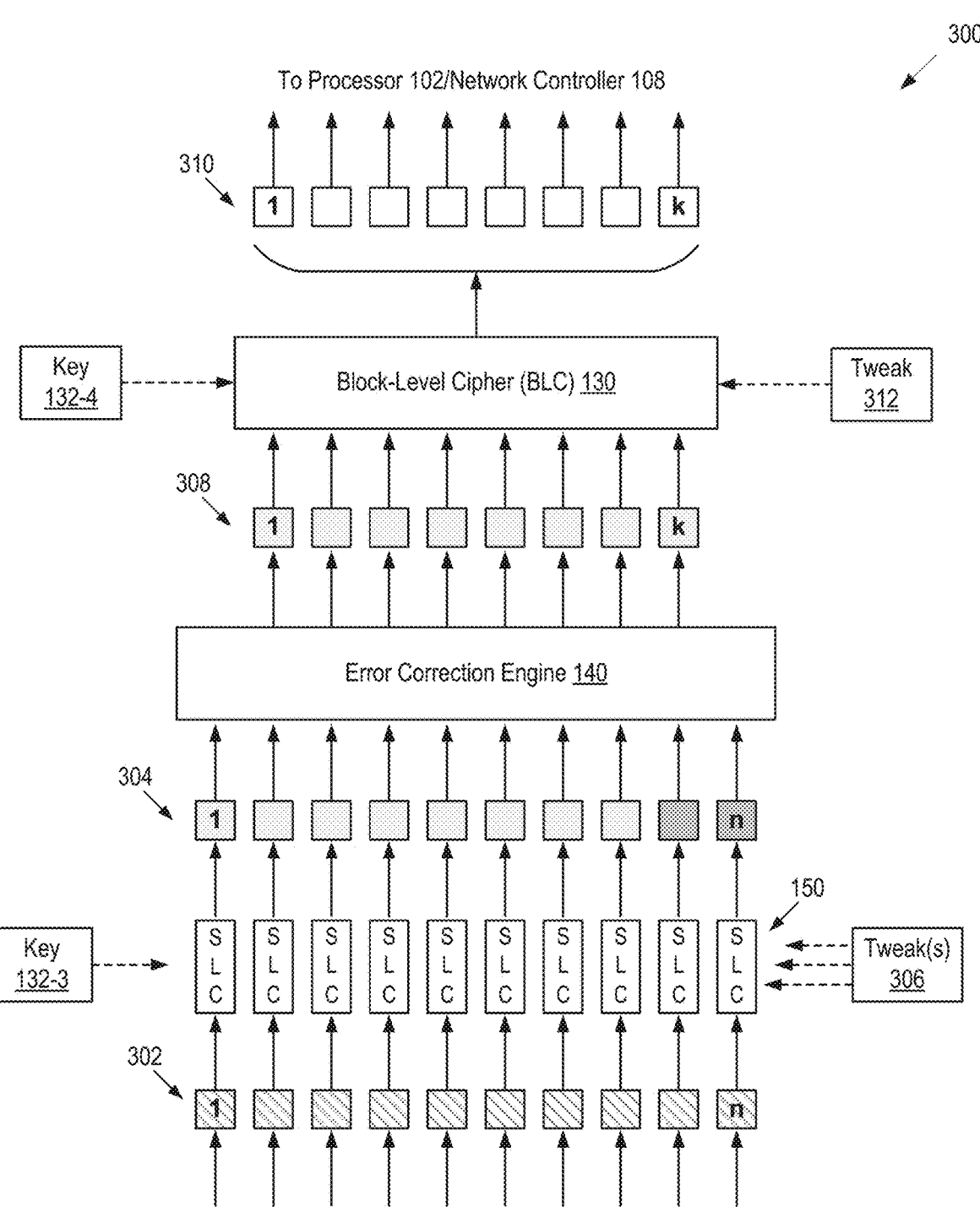
FIG. 3 is a diagram illustrating operations of decryption of an error-corrected codeword for protection against corruption of data and adversarial attacks, in accordance with some aspects of the present disclosure.

FIG. 3 is a diagram illustrating operations 300 of decryption of an error-corrected codeword for protection against corruption of data and adversarial attacks, in accordance with some aspects of the present disclosure. Operations 300 may be performed (e.g., by cryptographic engine 120 of FIG. 1) in a reverse order compared to the order in FIG. 2. As depicted in FIG. 3, operations 300 may include receiving, from memory 160 and/or network controller 108, n encoded symbols of encrypted codeword 302 and processing various symbols through a set of SLCs 150 to obtain a decrypted codeword 304.

As described above in conjunction with FIG. 3, separate SLCs 150 may process various n encoded symbols (i) individually and in parallel, (ii) individually and sequentially, (iii) collectively and in parallel (e.g., p symbols on once by at the same SLC), and so on. SLCs 150 may use additional inputs to decrypt symbols of encrypted codeword 302, e.g., a cryptographic key 132-3 and one or more tweaks 306. The cryptographic key 132-3 and tweak(s) 306 may be the same as previously used during the encryption process (e.g., as described above in conjunction with FIG. 2), with each symbol decrypted using an individualized tweak 306, which may be derived from the memory address (including a symbol offset) where the respective symbol of encrypted codeword 302 was stored. Additional inputs to SLCs 150 may include counters and various nonce values.

Decrypted codeword 304 may be decoded by EC engine 140, which may detect and correct a number of errors in symbols of decrypted codeword 304. For example, the EC engine may detect and correct up to (n–k)/2 and may also be capable of detecting (and correcting) more errors but with less than 100% reliability. EC engine 140 may output k (corrected, if needed) symbols of encrypted data block 308. BLC 130 may decrypt encrypted data block 308 to obtain a decrypted data block 310. BLC 130 may be any block-wide cipher, e.g., as described above in conjunction with FIG. 2. BLC 130 may use additional inputs to obtain decrypted data block 310, e.g., a cryptographic key 132-4, which may be the same or different from cryptographic key 132-3. Additional input to BLC 130 may include a tweak 312, which may be any value specific to the current operation, e.g., a memory address where encrypted codeword 302 was stored. Additional input to BLC 130 may include a counter or any other suitable nonce value.

The decrypted data block 310 may be provided to processor 102 or communicated to network controller 108 for transmission over a network. In those instances, where EC engine 140 fails to recover a valid encrypted block 308, cryptographic engine 120 may signal a memory (or transmission failure) to a relevant application 110 that owns the data. Such situations may occur in the instances of random (e.g., environmental or hardware) errors or when the encrypted codeword 302 has been modified in an adversarial attack.

Figure 4:
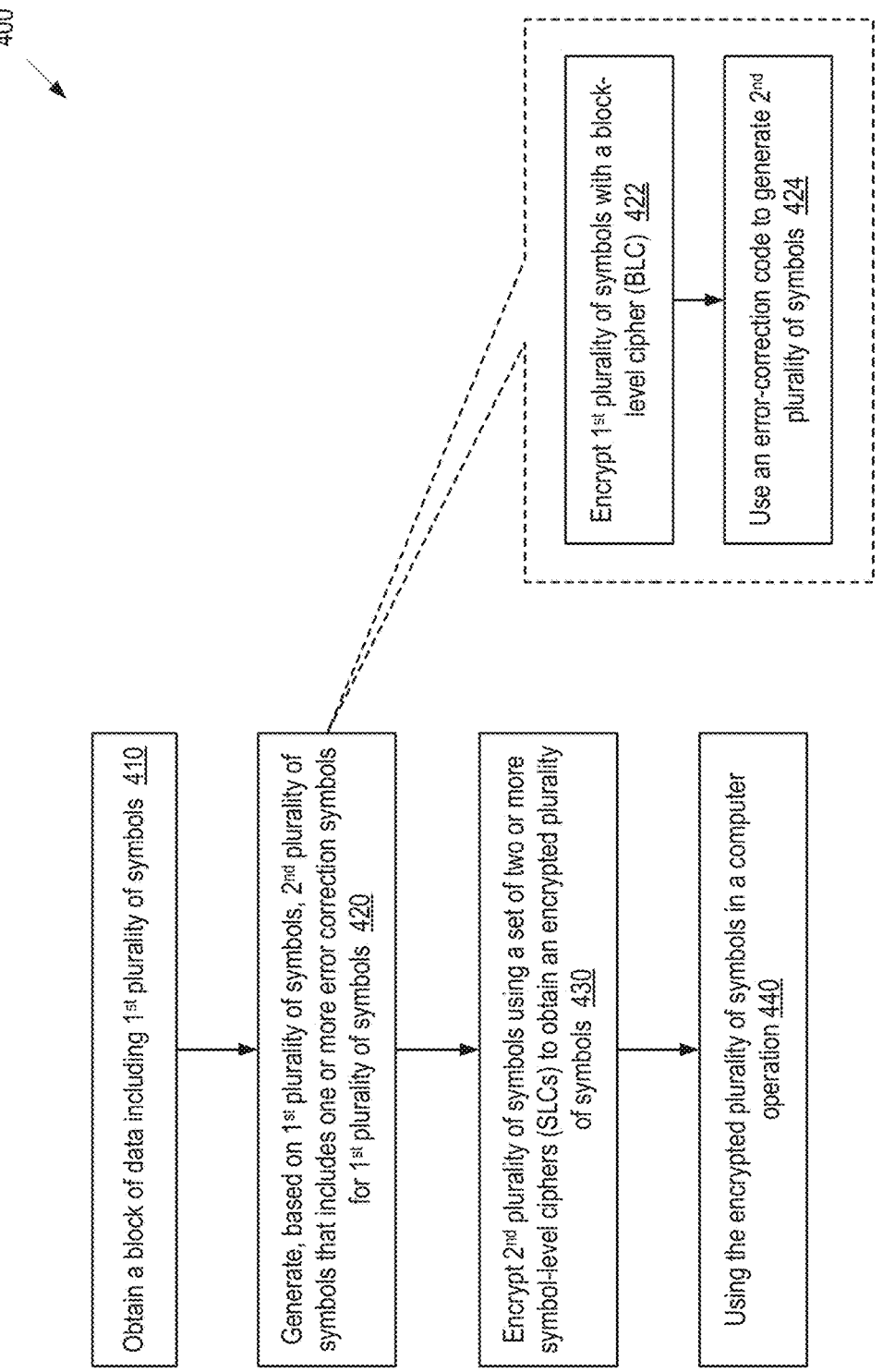
FIG. 4 is a flow diagram illustrating an example method of encryption of error-corrected codewords, in accordance with some implementations of the present disclosure.
Figure 5:
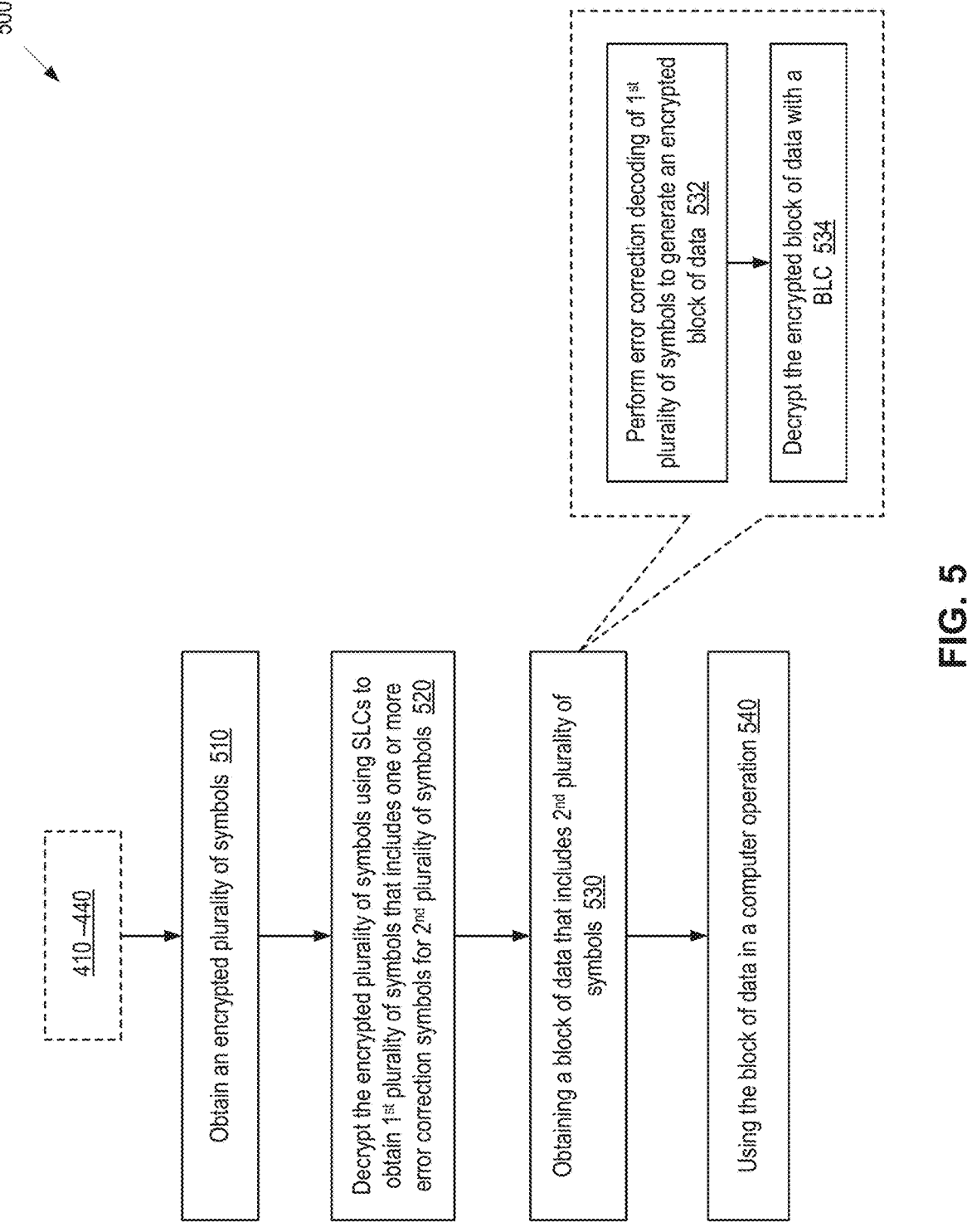
FIG. 5 is a flow diagram illustrating an example method of decryption of error-corrected codewords, in accordance with some implementations of the present disclosure.

FIGS. 4-5 illustrate example methods 400 and 500 that can be used for security of error-corrected codewords, including protection against corruption of data and adversarial attacks. Methods 400 and 500 and each of their individual functions, routines, subroutines, and/or operations may be performed by a cryptographic engine 120 of FIG. 1 or any other suitable processing units, e.g., a general-purpose processor, such as processor 102 of FIG. 1. Some blocks of methods 400 and 500 may be optional. Methods 400 and 500 may be implemented as part of data write and read operations and/or as part of a network data communication operation. In certain implementations, a single processing thread may perform methods 400 and 500. Alternatively, two or more processing threads may perform methods 400 and 500, each thread executing one or more individual functions, routines, subroutines, or operations of the methods. In an illustrative example, the processing threads implementing methods 400 and 500 may be synchronized (e.g., using semaphores, critical sections, and/or other thread synchronization mechanisms). Alternatively, the processing threads implementing methods 400 and 500 may be executed asynchronously with respect to each other.

FIG. 4 is a flow diagram illustrating an example method 400 of encryption of error-corrected codewords, in accordance with some implementations of the present disclosure. At block 410, processing units performing method 400 may obtain a block of data (e.g., data block 202 of FIG. 2) that has a first plurality of symbols, e.g., k one-byte symbols, two-byte symbols, etc. In some implementations, the block of data may be at least 128 bits. At block 420, method 400 may continue with the processing units generating, based on the first plurality of symbols, a second plurality of symbols (e.g., codeword 208). The second plurality of symbols may include one or more error correction symbols for the first plurality of symbols. In some implementations, each symbol of the second plurality of symbols may be an 8-bit symbol or a 16-bit symbol.

As depicted with the callout portion of FIG. 4, generating the second plurality of symbols may include a number of operations. More specifically, at block 422, the processing units may encrypt the first plurality of symbols with a block-level cipher (e.g., BLC 130 of FIG. 1). In some implementations, the BLC may be a Rijndael BLC, a Kalyna BLC, an Encrypt-Mix-Encrypt BLC, an Adiantum BLC, or the like. In some implementations, an input into the BLC may include a tweak value, which may be a memory address, a nonce, or any other suitable value. At block 424, an error-correction (EC) code may be applied to the output of the BLC (e.g., encrypted data block 204) to generate the second plurality of symbols. In those implementations where encryption by the BLC is performed in a block-wide manner, each symbol of the second plurality of symbols generated by the BLC may be dependent on all symbols of the first plurality of symbols.

At block 430, method 400 may continue with the processing units encrypting the second plurality of symbols using a set of two or more symbol-level ciphers (e.g., SLCs 150) to obtain an encrypted plurality of symbols (e.g., encrypted codeword 210). Each SLC of the set of SLCs may encrypt one or more symbols of the second plurality of symbols. In some implementations, each SLC of the set of SLCs may use a different tweak value to encrypt the respective one or more symbols of the second plurality of symbols. In some implementations, each SLC of the set of SLCs may encrypt a separate symbol of the second plurality of symbols and may output a separate encrypted symbol of the encrypted plurality of symbols (e.g., as illustrated with the set of SLCs 150 in FIG. 2).

At block 440, method 400 may use the encrypted plurality of symbols (e.g., encrypted codeword 210) in a computer operation. In some implementations, the computer operation may include transmitting the encrypted plurality of symbols over a network. In some implementations, the computer operation may include storing the encrypted plurality of symbols in a memory device. "Memory device" should be understood as any device or system capable of storing non-transitory data, including one or more memory chips, a physical partition of any memory system, a logical partition of any memory system, and so on.

FIG. 5 is a flow diagram illustrating an example method 500 of decryption of error-corrected codewords, in accordance with some implementations of the present disclosure. In some instances, method 500 may follow the performance of method 400. For example, method 500 may be used to decrypt a codeword previously encrypted using method 400 and stored in a memory device or transmitted over a network. In some implementations, methods 400 and 500 may be performed by the same computing device, e.g., in the instances where data is stored locally on the computing device. In some implementations, methods 400 and 500 may be performed by different computing devices, e.g., in the instances where data is communicated over a network. At block 510, processing units performing method 500 may obtain an encrypted plurality of symbols (e.g., encrypted codeword 302 of FIG. 3), e.g., by fetching the encrypted plurality of symbols from memory or from a network. At block 520, method 500 may continue with the processing units decrypting the encrypted plurality of symbols using a set of two or more SLCs to obtain a first plurality of symbols (e.g., decrypted codeword 304). Each SLC of the set of SLCs (e.g., SLCs 150) may decrypt one or more encrypted symbols of the encrypted plurality of symbols. The first plurality of symbols (e.g., decrypted codeword 304) may include one or more error correction symbols for a second plurality of symbols (e.g., symbols of data block 310).

At block 530, the processing units may obtain a block of data (e.g., decrypted data block 310) that includes the second plurality of symbols. As depicted with the callout portion of FIG. 5, obtaining the block of data may include a number of operations. More specifically, at block 532, obtaining the block of data may involve performing error correction decoding of the first plurality of symbols (e.g., using EC engine 140 to decode codeword 304) to generate an encrypted block of data (e.g., encrypted data block 308). At block 534, the processing units may then decrypt the encrypted block of data with a block-level cipher (e.g., decrypt encrypted data block 308 using BLC 130).

At block 540, method 500 may continue with selecting, based on a result of the error correction decoding, a computer operation associated with the block of data. More specifically, responsive to the result of the error correction decoding being a success, method 500 may perform, at block 550, one or more additional operations using the block of data. For example, the one or more additional operations may include providing the block of data to an intended recipient (e.g., a processing device, an application, and/or the like), using the block of data in any suitable computer operation, e.g., performing any processing operation by a processor (e.g., processor 102 of FIG. 1), storing the block of data in cache (e.g., cache 104), communicating the block of data via a network (e.g., using network controller 108), and the like. Responsive to the result of the error correction decoding being a failure, method 500 may include, at block 560, causing a remedial action to be performed. In particular, the processing device performing method 500 may not be distinguishing between an adversarial attack and an environmental error and may, therefore, treat errors with at least a threshold severity as potential adversarial attacks. Correspondingly, the remedial actions may include discarding or deleting the data in which the error has been detected, including any related data, e.g., data associated with the same application, data processed over the most recent time interval T, all data presently stored in the memory of the processing device, and/or the like. Remedial actions may further include erasing any of the aforementioned data, triggering an alarm, causing a fault/interrupt, powering down the device, and/or the like. The severity of the EC error that causes a remedial action may depend on a specific implementation. In some implementations, the EC decoding may be treated as a success if EC decoding detects and corrects no more than n*errors in the codeword and may be treated as a failure if the EC decoding detects more than n*errors or otherwise detects an uncorrectable error(s) in the codeword. In some implementations, n* may be set equal to the maximum number of errors that the EC code may correct, e.g., $n^*=t/2$. In some implementations, n*may be set to a value that is less than the maximum number of errors that the EC code may correct, $n^*<t/2$.

Figure 6:
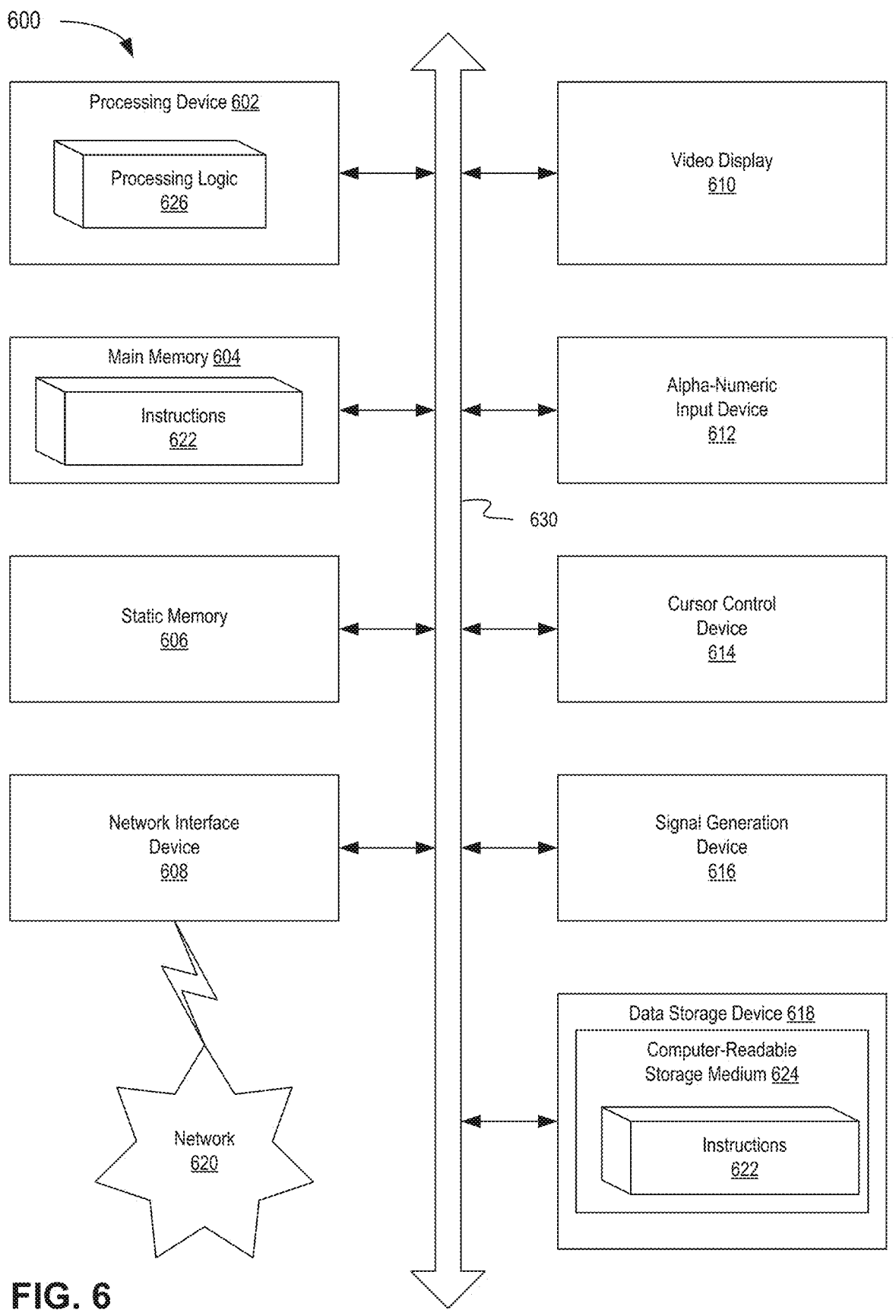
FIG. 6 depicts a block diagram of an example computer system operating in accordance with one or more aspects of the present disclosure.

FIG. 6 depicts an example computer system 600 that can perform any one or more of the methods described herein, in accordance with some implementations of the present disclosure. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 618, which communicate with each other via a bus 630.

Processing device 602 (which can include processing logic 626) represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 622 for implementing encryption operations, decryption operations, EC encoding operations, EC decoding operations, and various combinations thereof, including methods 400 and 500 described in conjunction with FIGS. 4-5.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker). In one illustrative example, the video display unit 610, the alphanumeric input device 612, and the cursor control device 614 may be combined into a single component or device (e.g., an LCD touch screen).

The data storage device 618 may include a computer-readable storage medium 624 on which is stored the instructions 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting computer-readable media. In some implementations, the instructions 622 may further be transmitted or received over a network via the network interface device 608.

While the computer-readable storage medium 624 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operations may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method comprising:

encrypting, using a block-level cipher (BLC), a block of data comprising a first plurality of k symbols to obtain an encrypted first plurality of k symbols;

generating, based on the first plurality of k symbols, a second plurality of n symbols, wherein the second plurality of n symbols comprises the encrypted first plurality of k symbols and n-k error correction symbols for the encrypted first plurality of k symbols;

encrypting the second plurality of n symbols to obtain an encrypted second plurality of n symbols, wherein each symbol of the encrypted second plurality of n symbols is individually encrypted by a symbol-level cipher (SLC) of a set of two or more SLCs, each SLC of the set of SLCs encrypting one or more symbols of the second plurality of n symbols; and using the encrypted second plurality of n symbols to recover the first plurality of k symbols.

2. The method of claim 1, wherein each symbol of the second plurality of n symbols is dependent on all symbols of the first plurality of k symbols.

3. The method of claim 1, wherein the BLC is one or a Rijndael BLC, a Kalyna BLC, an Encrypt-Mix-Encrypt BLC, or an Adiantum BLC.

4. The method of claim 1, wherein the block of data is at least 128 bits.

5. The method of claim 1, wherein an input into the BLC comprises a tweak value.

6. The method of claim 1, further comprising at least one of:

storing the encrypted second plurality of n symbols in a memory device, or transmitting the encrypted second plurality of n symbols over a network.

7. The method of claim 1, wherein each SLC of the set of SLCs uses a different tweak value to encrypt respective-the one or more symbols of the second plurality of n symbols.

8. The method of claim 1, wherein each symbol of the second plurality of n symbols is an 8-bit symbol or a 16-bit symbol.

9. The method of claim 1, wherein each SLC of the set of SLCs encrypts a separate symbol of the second plurality of n symbols and outputs a separate encrypted symbol of the encrypted second plurality of n symbols.

10. A method comprising:

decrypting an encrypted first plurality of n symbols to obtain a decrypted first plurality of n symbols, wherein each symbol of the decrypted first plurality of n symbols is individually decrypted by a symbol-level cipher (SLC) of a set of two or more SLCs, each SLC of the set of SLCs decrypting one or more symbols of the encrypted first plurality of n symbols, and wherein the decrypted first plurality of n symbols comprises an encrypted second plurality of k symbols and n-k error correction symbols for the encrypted second plurality of k symbols;

performing error correction decoding of the decrypted first plurality of n symbols to obtain the encrypted second plurality of k symbols; and performing at least one of:

responsive to the error correction decoding being successful, decrypting, using a block-level cipher (BLC), the encrypted second plurality of k symbols to obtain a block of data comprising a decrypted second plurality of k symbols, or responsive to the error correction decoding being a failure, causing a remedial action to be performed.

11. The method of claim 10, wherein each symbol of the decrypted first plurality of n symbols is dependent on all symbols of the decrypted second plurality of k symbols.

12. The method of claim 10, wherein the block of data is at least 128 bits, and wherein each symbol of the decrypted first plurality of n symbols is an 8-bit symbol or a 16-bit symbol.

13. The method of claim 10, wherein each SLC of the set of SLCs uses a different tweak value to decrypt the one or more symbols of the encrypted first plurality of n symbols, and wherein each SLC of the set of SLCs decrypts a separate symbol of the encrypted first plurality of n symbols and outputs a separate symbol of the decrypted first plurality of n symbols.

14. The method of claim 10, wherein the remedial action comprises at least one of:

discarding the encrypted second plurality of k symbols;

discarding data associated with an application that generated the encrypted first plurality of n symbols;

discarding at least some of data stored in a memory storing the encrypted first plurality of n symbols;

triggering an alarm;

causing a fault/interrupt; or powering down a computing device.

15. A system comprising:

a memory system; and one or more processing units operatively coupled to the memory system, the one or more processing units to:

encrypt, using a block-level cipher (BLC), a block of data comprising a first plurality of k symbols to obtain an encrypted first plurality of k symbols;

generate, based on the first plurality of k symbols, a second plurality of n symbols, wherein the second plurality of n symbols comprises the encrypted first plurality of k symbols and n-k error correction symbols for the encrypted first plurality of k symbols;

encrypt the second plurality of n symbols to obtain an encrypted second plurality of n symbols, wherein each symbol of the encrypted second plurality of n symbols is individually encrypted by a symbol-level cipher SLC of a set of two or more SLCs, each SLC of the set of SLCs encrypts one or more symbols of the second plurality of n symbols; and use the encrypted second plurality of n symbols to recover the first plurality of k symbols.

16. The system of claim 15, wherein to recover the first plurality of k symbols, the one or more processing units are to:

retrieve the encrypted second plurality of n symbols from a memory system;

decrypt the encrypted second plurality of n symbols using the set of SLCs to obtain a third plurality of n symbols, wherein the third plurality of n symbols is different from the second plurality of n symbols in at least one symbol;

obtain the block of data comprising the first plurality of k symbols, wherein to obtain the block of data, the one or more processing units are to:

perform an error correction decoding of the third plurality of n symbols.

17. The system of claim 15, wherein each symbol of the second plurality of n symbols is dependent on all symbols of the first plurality of k symbols.

18. The system of claim 15, wherein each SLC of the set of SLCs encrypts a separate symbol of the second plurality of n symbols and outputs a separate encrypted symbol of the encrypted second plurality of n symbols.

* * * * *